F. A. SCHROEDER.
Portable Stoves.

No. 146,283.   Patented Jan. 6, 1874.

Witnesses.
John Becker.
Fred Haynes

F. A. Schroeder
by his Attorneys
Brown & Allen

UNITED STATES PATENT OFFICE.

FERDINAND A. SCHROEDER, OF JERSEY CITY, NEW JERSEY, ASSIGNOR TO HIMSELF AND CHARLES HERMANN BRUECKNER, OF SAME PLACE.

IMPROVEMENT IN PORTABLE STOVES.

Specification forming part of Letters Patent No. 146,283, dated January 6, 1874; application filed September 2, 1873.

*To all whom it may concern:*

Figure 1:
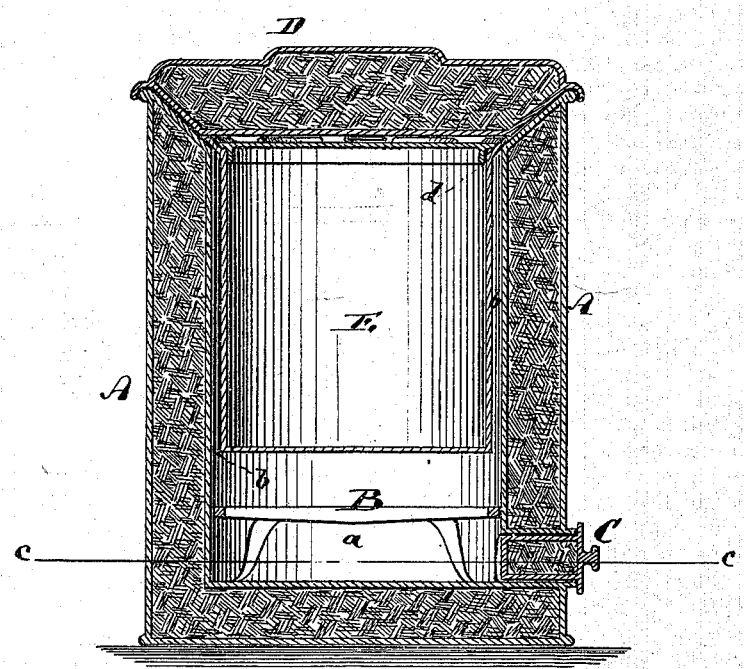
Figure 2:
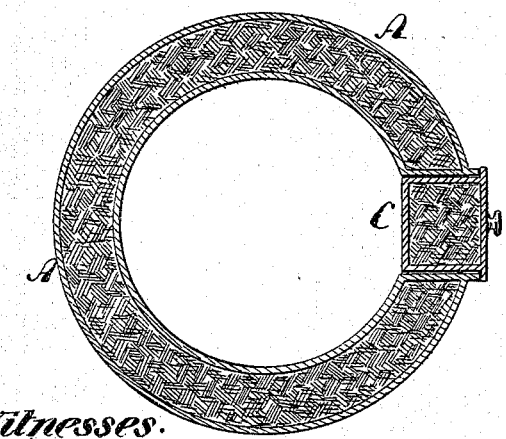
Figure 3:
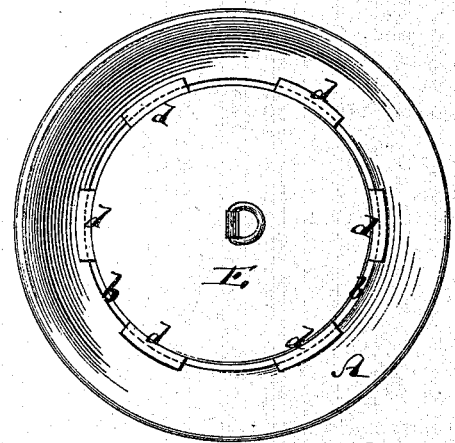

Be it known that I, FERDINAND ADOLPH SCHROEDER, of Jersey City, in the county of Hudson and State of New Jersey, have invented an Improved Stove, of which the following is a specification:

Figure 1 is a vertical central section of my improved stove. Fig. 2 is a horizontal section of the same on the line *c c*, Fig. 1. Fig. 3 is a plan or top view of the same when the upper lid is removed.

Similar letters of reference indicate corresponding parts in all the figures.

This invention has for its object to economize fuel in the cooking of food and other substances; and consists in the construction of a portable furnace which can be hermetically sealed to prevent, after the fire has been started, the escape of the heat as well as gases developed by the fire, and which will, therefore, retain the heat of the fire for a sufficiently long time without consuming fuel, and thus boil to the requisite extent the matter contained within a vessel placed within the furnace.

In the accompanying drawing, the letter A represents the case or shell of my improved stove. The same is made of cylindrical or other suitable form, of proper size, and, by preference, of sheet metal; but, if made of sheet metal, it is made in two thicknesses throughout, between which a filling of sand, plaster, or other non-heat-conducting substance should be placed. Within this shell A is placed or fixed a suitable grate, B. An opening at the side of the shell A, leading to the chamber *a* beneath the grate B, serves as a draft-flue, and may be completely and hermetically closed by a plug, C, which is, by preference, of substantially the same construction as the shell A, as is fully indicated in Figs. 1 and 2. The vessel A is open on top, but can be covered and completely closed by a lid or cover, D, which is also of substantially the same construction as the shell A as to cross-section. E is a pan or vessel, of such size that it may conveniently fit the chamber within the shell A above the grate B. The diameter of the vessel E is so much smaller than the interior diameter of the shell A that an annular or other shaped space, *b*, is formed between these two vessels, as shown in Fig. 1. The vessel E is either provided with projecting lugs *d d* at its upper part, so that it may be suspended from the rim or edge of the vessel A, or it is provided with supports at the lower end, so that it may stand on the bottom of the vessel A, or on the grate B, or else suitable internal supports may be arranged within the shell A for the vessel E to stand upon.

For operation, the apparatus is used as follows: A fire is built upon the grate B, the matter to be cooked placed within the vessel E, and the latter, when closed, inserted within the shell A, while the cover D is removed from the same. The plug C is also withdrawn, so that the fire beneath E may get a proper start, the gases escaping around E through the annular or other shaped passage *b*. For the escape of these gases, a chimney-connection may be arranged either at one side of the shell A or on top, although for ordinary purposes, since the apparatus is portable and easily put out of doors, the escape of smoke, &c., will not be inconvenient. After the fire has been properly started, the cover D is closed down upon the vessel A and the plug C inserted, so that access of air to the fire-space will be absolutely prevented. The heat of the fire will then be retained as fully as though the fire itself were kept up, and the contents of E will, by such continuous heat, be boiled, whereupon the lid D may be removed, the vessel E withdrawn, and its contents used in the manner desired. Thus the full amount of heat given out by the fire will be utilized for cooking purposes, and all that portion of the fuel not absolutely consumed before the lid D and plug C are closed will still be in condition for future use.

I claim as my invention and desire to secure by Letters Patent—

The stove consisting of the shell A, grate B, removable plug C, which is beneath the grate-cover D, and detachable vessel E, all arranged substantially as herein shown and described.

F. A. SCHROEDER.

Witnesses:
A. V. BRIESEN,
MICHAEL RYAN.